US006332617B1

(12) United States Patent
Leveaux et al.

(10) Patent No.: US 6,332,617 B1
(45) Date of Patent: Dec. 25, 2001

(54) LEAKTIGHT SEAL OF A CIRCULAR VANE STAGE

(75) Inventors: Jacques Leveaux, Vert Saint Denis; Jacky Serge Naudet, Bondoufle, both of (FR)

(73) Assignee: Societe Nationale D'Etude et de Construction de Moteurs D'Aviation "Snecma", Paris (FR)

( * ) Notice: Subject to any disclaimer, the term of this patent is extended or adjusted under 35 U.S.C. 154(b) by 0 days.

(21) Appl. No.: 09/255,023

(22) Filed: Feb. 22, 1999

(30) Foreign Application Priority Data

Mar. 12, 1998 (FR) ........................................ 98 03036

(51) Int. Cl.$^{7}$ ........................................ F16J 15/16

(52) U.S. Cl. .................... 277/433; 277/632; 277/637; 277/644; 416/221; 416/248

(58) Field of Search .............................. 277/433, 644, 277/630, 632, 637; 415/231, 230, 174.2; 416/215, 216, 217, 221–248

(56) References Cited

U.S. PATENT DOCUMENTS 2,912,222 11/1959 Wilkes, Jr. .
4,818,182 * 4/1989 Bouru ................................ 416/215
5,073,084 * 12/1991 Hirst ................................ 415/209.3
5,297,386 * 3/1994 Kervistin ............................ 60/226.1
5,460,489 * 10/1995 Benjamin et al. .................. 416/248
5,791,877 * 8/1998 Stenneler ............................ 416/221

FOREIGN PATENT DOCUMENTS 0 210 940 2/1987 (EP) .
2 320 439 3/1977 (FR) .
09278 8/1909 (GB) .

* cited by examiner

*Primary Examiner*—Anthony Knight
*Assistant Examiner*—Alison K. Pickard
(74) *Attorney, Agent, or Firm*—Oblon, Spivak, McClelland, Maier & Neustadt, P.C.

(57) ABSTRACT

A leaktight seal includes plaquettes that are housed between platforms of "hammer legged" vanes and a periphery of a rotor disc. The plaquettes lie above a throat that receives legs between a collar. The plaquettes are completed with heels that also lie between the legs. Centrifugal forces distort the seal and produce excellent leaktightness between the disc and the platforms.

9 Claims, 5 Drawing Sheets

PRIOR ART FIG. 1

LEAKTIGHT SEAL OF A CIRCULAR VANE STAGE

BACKGROUND OF THE INVENTION

1. Field of the Invention

The present invention relates to a leaktight seal for a circular vane stage and in particular a stage for "hammer legged" vanes, i.e. vanes being fastened to a disc using a leg with a bulbous cross-section that is inserted into a circular throat provided in a peripheral surface of the disc.

2. Description of the Related Art

If we refer to FIG. 1, vanes 1 of this kind can be seen on the circumference of discs 2 of a gas turbine stator 3 where they alternate with immobile vanes 4 used to rectify a gas flow and that are fastened to a stator 5. The vanes 1 comprise a blade 6 that constitutes the active section of the vanes and that lies in a gas flow chamber 7, a platform 8 used to define chamber 7 and that is adjacent to blade 6, a leg 9 that is inserted into a circular throat 10 of the relevant disc 2 and a fastener 11 that connects leg 9 to platform 8 and that passes through a collar 12 of throat 10 to reach the outside. The leg 9 has a bulbous cross-section, in other words, it widens from the zone at fastener 11 and given that collar 12 is narrower than the leg, said leg 9 is maintained in throat 10 despite the centrifugal forces. Disc 2 is, however, provided with a hole at a specific point on its circumference that widens collar 12 to enable legs 9 of vanes 1 to be inserted successively in throat 10 through said hole before vanes 1 are slid around disc 2 to reach their definitive position.

Re-circulated air may be noticed under platforms 8, in other words, air that is returned upstream towards the compressors in the machine and the low pressures, in the opposite direction to the flow of gas in chamber 7. This re-circulated air travels between vane 1 and disc 2 through throat 10 despite the parts being adjustable in this zone. This re-circulation leads to performance loss of the machine. Various kinds of leaktight seals have been put forward in order to reduce the performance loss such as circular Inconel wires 14 that are housed in throats 15 with a small cross-section cut into a peripheral surface 16 of disc 2, said wires 14 being under platforms 8 next to legs 9. The drawback with this solution is that the centrifugal forces cause wires 14 to leave throats 15 and move upwards to platforms 8 where they become worn or even cut. A leaktight seal that does not cause this damage to the vanes 1 is therefore preferred, particularly given that vanes 1, that are generally titanium, are expensive and also that the loss of a piece of a platform 8 can lead to serious damage to the compressor.

SUMMARY OF THE INVENTION

The present invention provides a suitable solution to the above-mentioned problem. The solution consists in a leaktight seal for a circular vane stage with legs that are inserted into a circular throat of a disc, blades, or platforms that are adjacent to the blades and which lie on a peripheral surface of the disc onto which the throat opens in the form of a circular collar, and fasteners that connect the legs to the platforms, said legs being inserted into the collar. The seal comprises a plate that is housed between the peripheral surface and the platforms, said plate being provided with apertures into which the fasteners are inserted. The plate is divided into plaquettes that are abutted and that are defined by a cutting line through the apertures, said apertures having a surface area that is smaller than a cross section of the vane legs. The seal is characterized in that it comprises heels that are joined to the plaquettes and that together constitute the components of the seal. The heels lie under the upper oblique flanks of the throat.

European Patent No. 210,940 describes a leaktight seal the upper section of which lies near the platforms of the vanes and that corresponds to the first part of this definition. This known seal does not, however, include the lower heels which provide additional leaktightness, which is improved like the others by the centrifugal forces present during operation.

Leaktightness is improved if the plate has edges that fold towards the inside of the disc and if the edges are inserted into circular grooves that are provided in the peripheral surface of the disc.

Excellent construction of the seal, that greatly facilitates assembly, is provided if the cutting lines comprise horizontal and circular lines and if the plaquettes form an obtuse angle with the heels. The horizontal and circular lines join at the heels using joints that are extended with slots between the heels and the plaquettes. The components of the seal are interconnected in pairs with the joint of each of the components of a pair being housed in the slot of the other component of the same pair, thus constituting a hinge.

BRIEF DESCRIPTION OF THE DRAWINGS

The invention will now be described in greater detail using the following figures that illustrate certain embodiments.

DETAILED DESCRIPTION OF THE INVENTION

Figure 1:
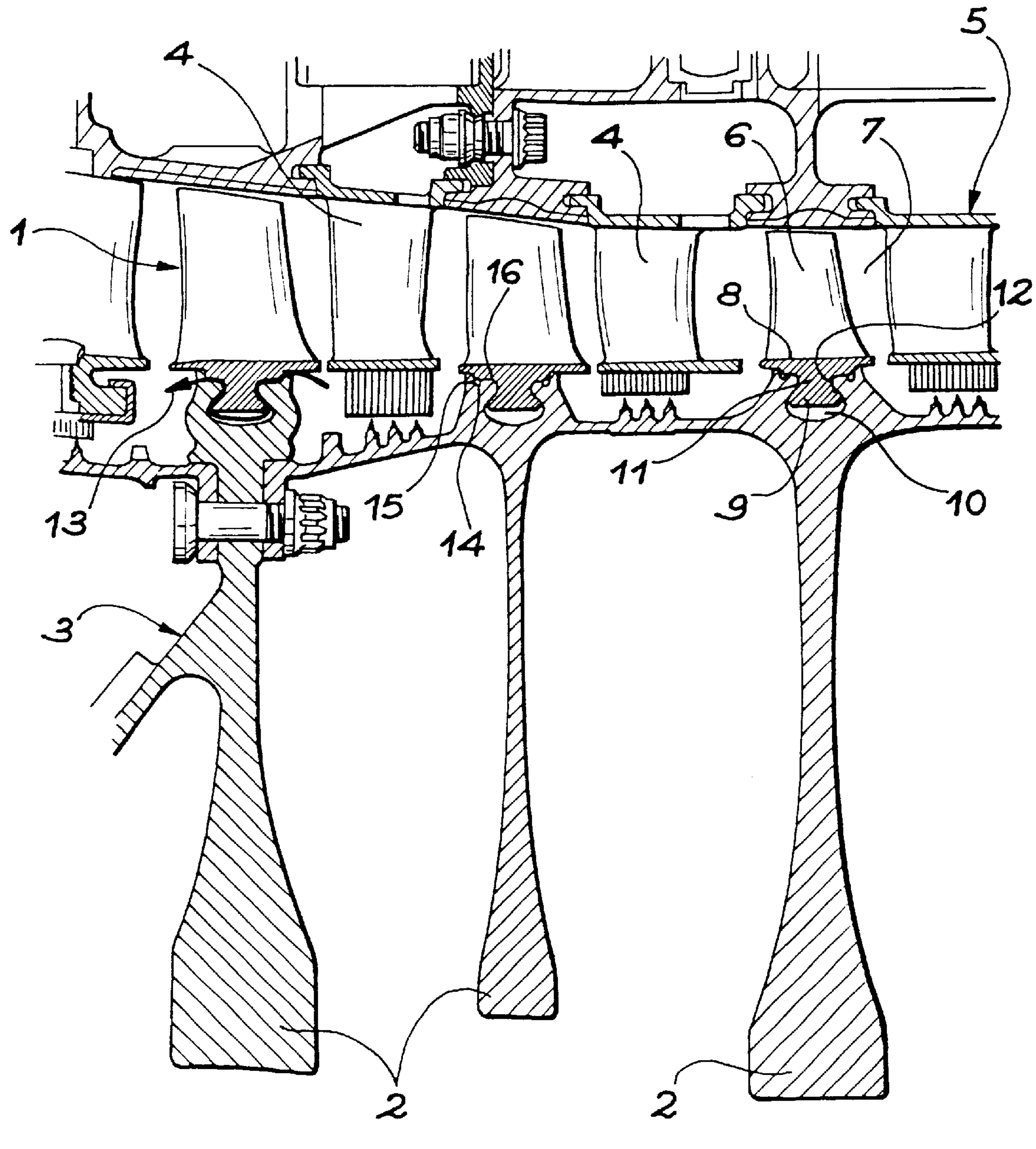
FIG. 1 (described above) shows a zone of a gas turbine compressor where the invention may be used.
Figure 2:
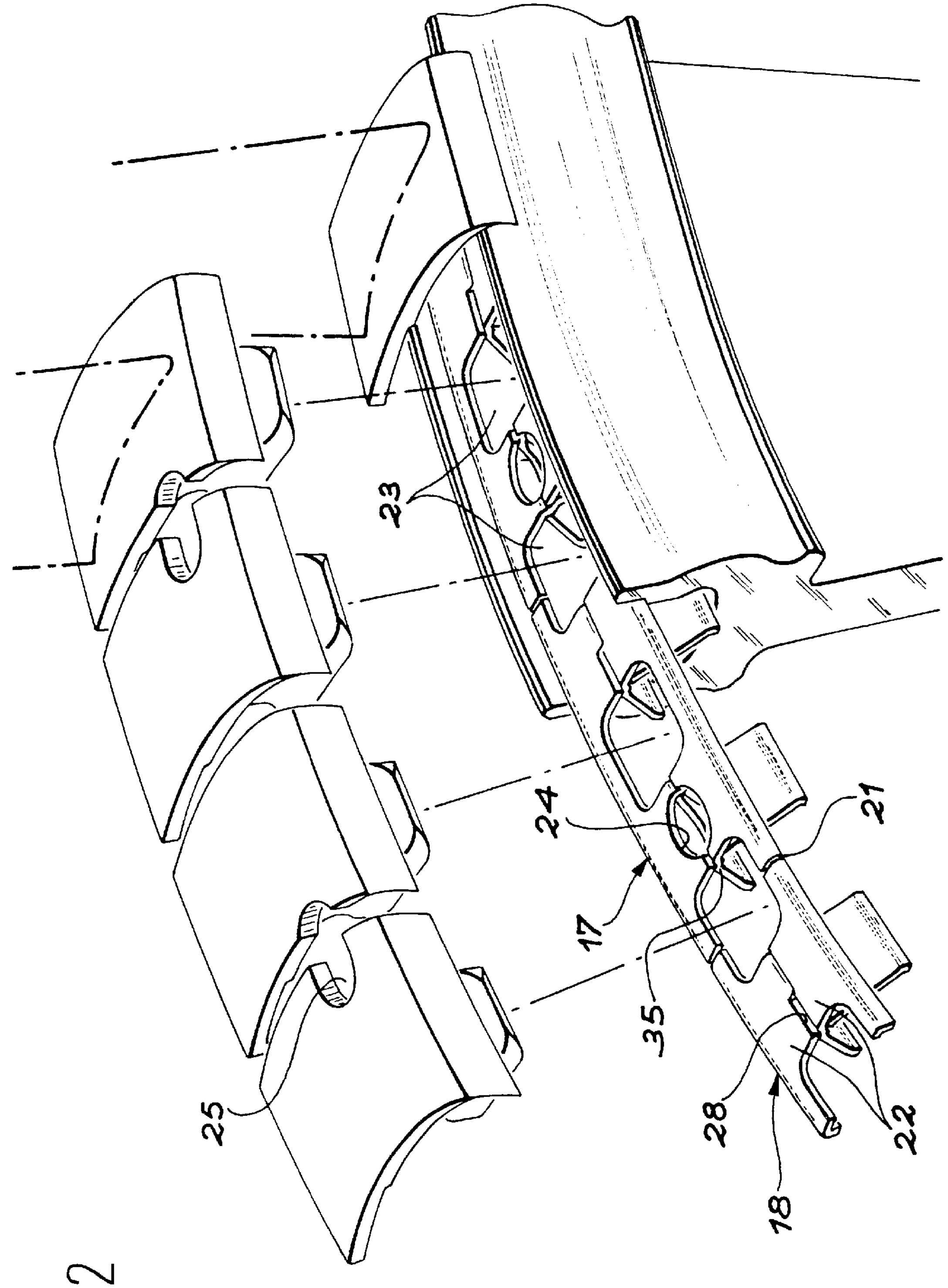
FIGS. 2 and 3 show a first embodiment of the invention.
Figure 3:
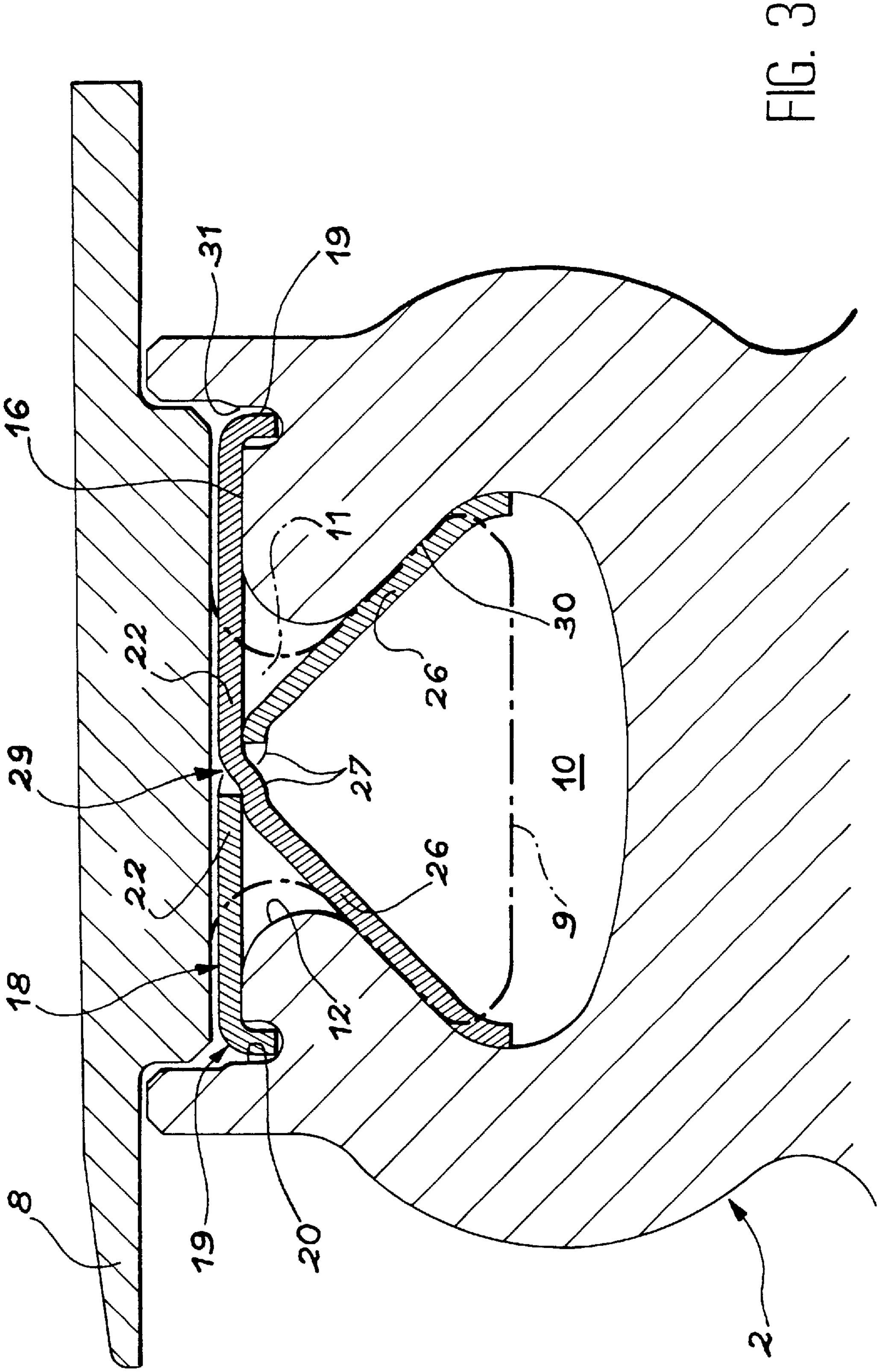

The invention has been added to the apparatus in FIG. 1 except that the wires 14 that it replaces have been eliminated as well as throat 15 that houses said wires. Referring to FIGS. 2 and 3, a seal 17 comprises a band or plate 18 that is more or less annular and that is inserted between the peripheral surface 16 of disc 2 and the platforms 8 when the rotor is assembled. Plate 18, however, has downward-sloping edges 19, in other words, edges that are folded towards the inside of the disc 2 and that enter grooves 20 which are provided in the peripheral surface 16. Finally, the plate 18 is angularly divided along longitudinal cutting lines 21 and also by a circular cutting line 35 that is equidistant between downward-sloping edges 19. The plate 18 is divided such that it is actually constituted by abutted plaquettes 22 that lie on angular semi-sections. Plaquettes 22 are provided with apertures 23 intended to receive the fasteners 11 of vanes 1, the surface area of which is smaller than the cross-section of legs 9. Some plaquettes 22 are provided with further perforations 24 thus extending other perforations 25 that are pierced through corresponding platforms 8. Perforations 24 and 25 are intended to receive screws (not shown) the heads of which are inserted into the threads of disc 2 in order to immobilize seal 17 and vanes 1, said seal 17 and vanes 1 being joined by platforms 8 to resist circular movements. An arrangement of this kind is standard with vanes inserted into a common circular throat 10 in the disc 2. A single pair of perforations 24 and 25 may be sufficient but two pairs may also be envisaged, as in the present embodiment. Characteristically, seal 17 also comprises heels 26 that are respectively connected to plaquettes 22 using joints 27 that combine to form an obtuse angle. In this embodiment, and in order to reduce play, the width of fasteners 11 and legs 9 of vanes 1 (in the angular direction of disc 2) is almost equal to that of apertures 23 and the width of heels 26 lies over most of the distance between apertures 23. Therefore, almost all of throat 10 is occupied. Moreover, joints 27 extend over almost half of the width of heels 26 and leave a slot 28 between each pair of plaquettes 22 and heels 26 into which the joint 27 of another pair of plaquettes 22 and heels 26 is inserted. Plaquettes 22 of the two pairs are joined and extend in the longitudinal direction of the machine. In other words, the pairs of plaquettes 22 and heels 26 are grouped together in pairs that overlap, each heel 26 lying under plaquette 22 of the other component of the pair and the joints 27 lying in an extension along the circular cutting line with sufficient play to constitute a hinge 29. Once the joints 27 have been inserted into slots 28, it is therefore possible to fold the assembly thus obtained in order to draw heels 26 closer together and to insert them into throat 10 using an inward movement passing through the collar 12. Heels 26 are then unfolded to separate from one another, causing the plaquettes 22 to be parallel. The arrangement shown in the figures where heels 26 are in contact with upper oblique flanks 30 of throat 10 is thus achieved. It is understood that the centrifugal forces caused by rotor 3 rotating will press heels 26 against flanks 30, plaquettes 22 against platform 8, and the downward-sloping edges 19 against outer surfaces 31 of the grooves 20 due to the deflection of plaquettes 22. A double leaktight barrier against re-circulated air is thus obtained with plaquettes 22 and their downward-sloping edges 19 producing a first barrier between platforms 8 and disc 2 and heels 26 producing a second barrier between plaquettes 22 that are pressed against platforms 8 and disc 2.

Figure 4:
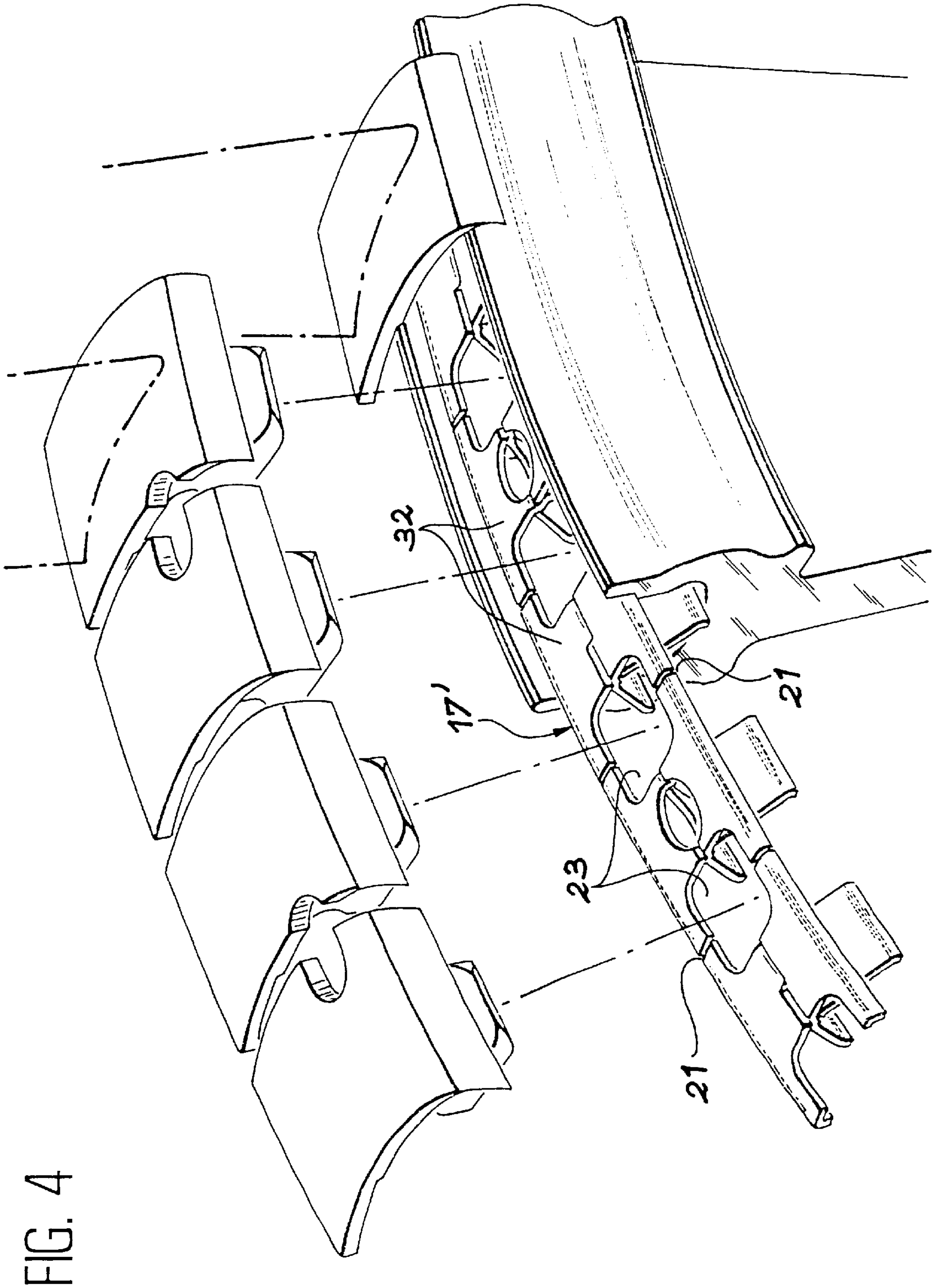
FIGS. 4 and 5 show a second embodiment of the invention.
Figure 5:
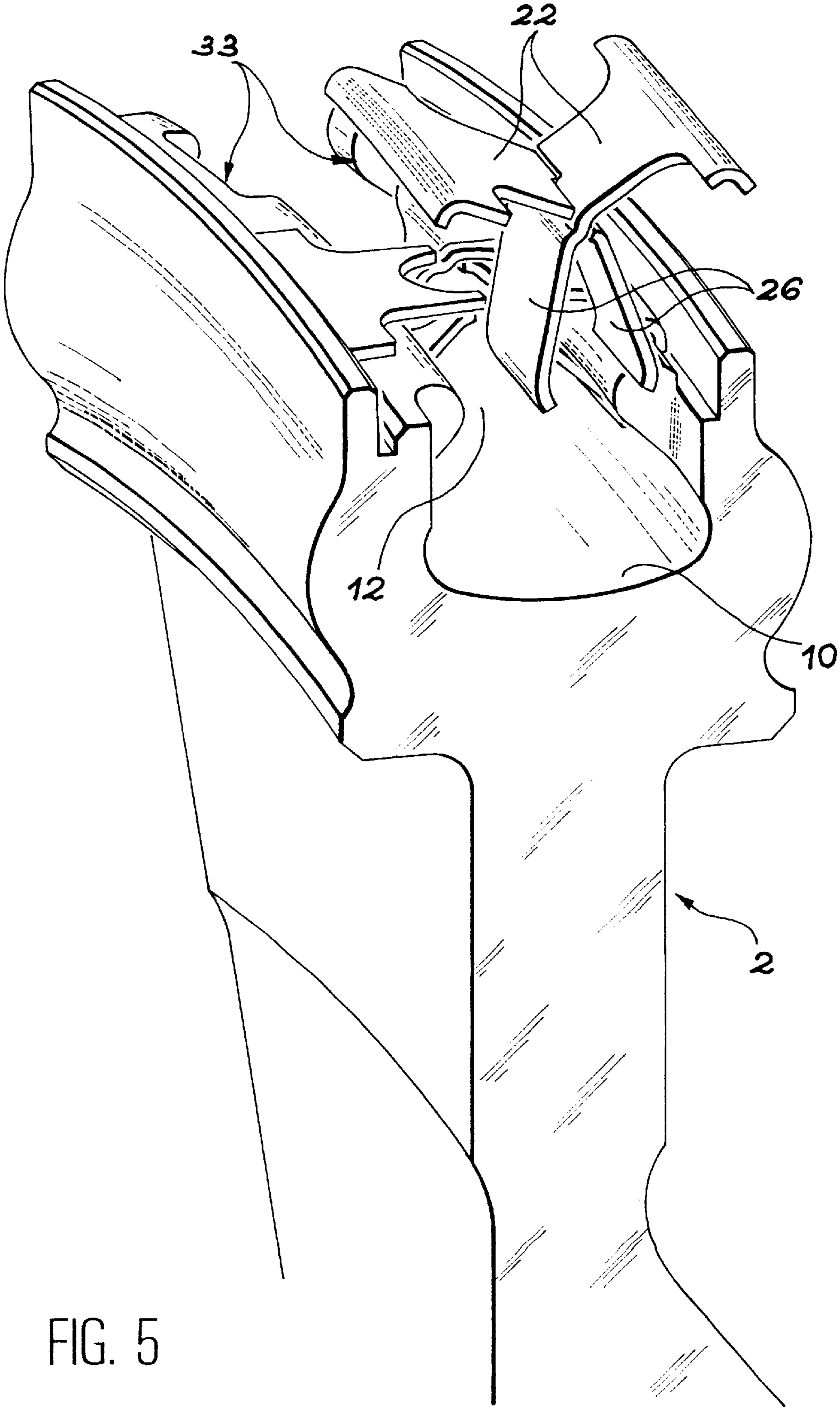

A slightly different embodiment of seal 17' is shown in FIGS. 4 and 5 where the plates 32 are twice as narrow and can therefore lie between cutting lines 21 in twice the number, from the center of one of the apertures 23 to the center of the adjacent aperture 23. In other respects, this second embodiment is similar to the previous embodiment. FIG. 5 is a perspective view that shows one of the pairs of components that are folded in order for the heels 26 to pass through collar 12. FIG. 5 also shows a hole 33 used to enlarge a specific area of collar 12 to enable legs 9 of vanes 1 to be inserted. However, the first embodiment, in which a pair of plaquettes 22 was associated with vanes 1, required an even number of vanes. It may also be noted that, where hinges 29 were required in the first embodiment to fold heels 26 to enable them to be inserted in the throat 10, this step is no longer necessary in the second embodiment as the heels 26 are capable of passing through the hole 33 before they are slid into position in the throat 10 in the same way as legs 9 of vanes 1 and to alternate with said legs 9. The components of seal 17', comprising two plaquettes 22 that are interconnected with two heels 26, are then replaced by immobile vanes 4. Hinges 29 are, however, preserved in order for the flexibility of seal 17' to be maintained and for perfect leaktightness to be achieved.

What is claimed is:

1. A leaktight seal adapted to a circular vane stage with legs that are inserted into a throat formed in a rotatable disc and having upper oblique flanks, said seal comprising:

a plate divided into plaquettes that are abutted to each other above the throat and that are defined by cutting lines;

wherein each of the plaquettes has a heel dependent therefrom and is adapted to lay against one of the upper oblique flanks inside the throat; and wherein said cutting lines include longitudinal lines and circular lines;

wherein each of the plaquettes forms an obtuse angle with the heel; and wherein each of the plaquettes join the heel at a joint forming a hinge adjacent to a slot configured to receive an adjoining plaquette and heel.

2. A leaktight seal according to claim 1, wherein:

said plate has downwardly sloping edges that are bent and insertable into circular grooves provided in a top peripheral surface of the rotatable disc.

3. A leaktight seal adapted to a vane stage with a throat formed in a disc and having internal side flanks, said seal comprising:

a plate divided into plaquettes that are abutted to each other;

wherein each of the plaquettes is joined to a heel that is adapted to lay under one of the side flanks of the throat; and wherein each of the plaquettes forms an obtuse angle with the heel.

4. A leaktight seal according to claim 3, wherein:

said plate has edges that are insertable into grooves in the disc.

5. A combination, comprising:

a leaktight seal;

a circular vane stage with legs; and a rotatable disc with a throat formed therein and having upper oblique flanks;

wherein the seal includes a plate divided into plaquettes that are abutted to each other above the throat and that are defined by cutting lines;

wherein each of the plaquettes has a heel dependent therefrom and lying against one of the upper oblique flanks inside the throat;

wherein the circular vane stage includes platforms on the rotatable disc;

wherein the plaquettes lie under the platforms; and wherein the heels extend between the legs of the circular vane stage.

6. A combination according to claim 5, wherein:

said cutting lines include longitudinal lines and circular lines;

each of the plaquettes forms an obtuse angle with the heel; and each of the plaquettes join the heel at ajoint forming a hinge adjacent to a slot configured to receive an adjoining plaquette and heel.

7. A combination according to claim 5, wherein:

said plate has downwardly sloping edges that are bent and inserted into circular grooves provided in a top peripheral surface of the rotatable disc.

8. A combination, comprising:

a leaktight seal;

a circular vane stage with legs; and a rotatable disc with a throat formed therein and having internal side flanks;

wherein the seal includes a plate divided into plaquettes that are abutted to each other;

wherein each of the plaquettes is joined to a heel that lies under one of the side flanks of the throat; and wherein each of the plaquette forms an obtuse angle with the heel.

9. A combination according to claim 8, wherein:

said plate has edges that are inserted into grooves in the disc.

* * * * *